United States Patent [19]

Muhlberger et al.

[11] Patent Number: 4,523,283

[45] Date of Patent: Jun. 11, 1985

[54] SERVICE-INTERVAL DISPLAY FOR MOTOR VEHICLE AND CIRCUIT FOR A DISPLAY OF THIS TYPE

[75] Inventors: Heinz Muhlberger, Eching; Erwin Starmuhler, Munich; Walter Weishaupt, Munich; Peter Flohr, Munich; Fritz Bourauel, Munich, all of Fed. Rep. of Germany

[73] Assignee: Bayerische Motoren Werke AG, Fed. Rep. of Germany

[21] Appl. No.: 346,765

[22] Filed: Feb. 8, 1982

[30] Foreign Application Priority Data

Feb. 6, 1981 [DE] Fed. Rep. of Germany ....... 3104197

[51] Int. Cl.³ .................... G06F 3/14; G06F 15/20; G08B 5/36; G07C 5/08
[52] U.S. Cl. .................... 364/431.01; 340/52 D; 364/550
[58] Field of Search ........... 364/424, 442, 900, 431.01, 364/550, 551; 340/52 R, 52 D, 52 F, 753

[56] References Cited

U.S. PATENT DOCUMENTS

| | | | |
|---|---|---|---|
| 3,351,928 | 11/1967 | Smola | 340/753 |
| 4,031,363 | 6/1977 | Freeman et al. | 364/424 |
| 4,053,749 | 10/1977 | Shinoda et al. | 364/424 |
| 4,159,531 | 6/1979 | McGrath | 364/424 X |
| 4,243,985 | 1/1981 | Quayle | 340/753 |
| 4,244,514 | 1/1981 | Nomura et al. | 364/424 X |
| 4,267,569 | 5/1981 | Baumann et al. | 364/424 X |
| 4,284,972 | 8/1981 | Chiu et al. | 340/52 D |
| 4,356,470 | 10/1982 | Kogawa et al. | 340/52 F |
| 4,404,641 | 9/1983 | Bazarnik | 364/424 X |

FOREIGN PATENT DOCUMENTS 55-80011  6/1980  Japan .............................. 340/52 D

OTHER PUBLICATIONS

Rice: Solid State Level Indicator, Wireless World, vol. 86, No. 1535, Aug. 1980, pp. 31/33.

Primary Examiner—Felix D. Gruber
Attorney, Agent, or Firm—Craig and Burns

[57] ABSTRACT

A service-interval display for motor vehicles, delivers a signal after a fixed distance has been traversed, the fixed distance (D) is divided into several fixed service distance intervals ($i_d$) of equal length, and a plurality of individual signal elements, each of which changes its switch status at the end of successive intervals, is assigned to each of these intervals. The number of signal elements activated is an indication of the incremental approach to arrival at and travel beyond the fixed distance (D).

47 Claims, 7 Drawing Figures

FIG. 6 MULTIPLEXER

SERVICE-INTERVAL DISPLAY FOR MOTOR VEHICLE AND CIRCUIT FOR A DISPLAY OF THIS TYPE

The invention relates to a service-interval display for motor vehicles, which generates a signal after a fixed distance has been traveled.

Displays of this type are known wherein a pilot light is turned on, either alone or together with an acoustic signal, after the fixed distance has been traversed. These devices suffer from the disadvantage that the driver is surprised by the need for servicing, since he receives no information about when service must be performed, before the signal appears.

The goal of the invention is to provide a display of the type recited hereinabove wherein a clear message, indicating when service will be required, is provided at low cost.

The invention solves this problem by dividing the fixed distance into a plurality of fixed distance intervals of equal size, and by assigning an individual signal element to each of these intervals, said element changing its switch status at the end of the interval. Reading the signal elements reveals when the next service operation is due. In this way, a service operation can be performed early, for example before making a long trip. Alternatively, a decision can be made more or less precisely to postpone the service operation until after such a long trip.

The signal elements can be of the acoustic and/or optical type. The latter offers the advantage that a clear distinction can be made between the individual fixed distance intervals. An especially advantageous embodiment of such optical signal elements consists in pilot lights which are extinguished at the end of the fixed distance interval. The pilot lights which have not yet been extinguished show the driver, in the manner of a "good" reading, how far he can still travel before the next service operation must be performed.

To prevent the pilot lights from being turned on continuously during a trip, possibly irritating the driver, and also to display the distance already traveled during the trip, and particularly the distance which can still be traveled before a service operation is required, the pilot lights can be turned on before they reach the end of their fixed distance interval by closing the ignition circuit and turned off during or immediately after starting the vehicle engine. The pilot lights can be turned off as a function of the engine rpm or with the aid of an oil pressure switch or in another way, for example like the battery charge indicator light.

An illuminated sign, which remains lit at the same time the pilot light for the last fixed distance interval is extinguished, i.e., at the end of the fixed distance, can be used to indicate the need for a service operation especially clearly; for example OIL CHANGE.

Instead of an illuminated sign, or together with the latter, a warning indicator can remain on continuously. Both displays together announce the urgent need for servicing.

The warning display can be a warning light of a color different from that of the pilot lights. This color can be red or yellow for example, and thus represent a particularly urgent service requirement by contrast with the pilot lights, which are made green, for example.

If a service operation is not performed immediately after the fixed distance has been traveled, additional warning lights can be turned on successively at equal intervals during the subsequent distance overrun. The driver thus obtains information on the amount by which he has already exceeded the fixed distance.

The effect of the warning lights can be intensified by making the distance overrun intervals approximately half as long as the fixed distance intervals. The warning lights then appear successively twice as rapidly as the pilot lights change their switch status, and thus several warning lights will come on after a relatively short distance overrun.

In order to call attention to the need for servicing of motor vehicles which are driven relatively infrequently (many of the service operations performed are related primarily to aging phenomena and are only secondarily dependent upon the distance traveled) the travel time is introduced as an additional reference parameter in addition to the distance traveled. A fixed time is assigned to the fixed distance, and is divided into a number of fixed time intervals which is the same as the number of fixed distance intervals. The switch status of the signal elements is also modified when the corresponding fixed time interval elapses before the corresponding fixed distance interval. Appropriate selection of the fixed distance and fixed time makes the change in the switch status of the signal elements as a result of the expiration of the fixed time intervals occur only in those cases in which the distance traveled is shorter than average. Hence, the critical factor for the display remains the distance traveled. In this way, vehicles which are driven relatively infrequently can have their servicing requirements indicated as well as vehicles which travel at least an average distance.

Since the servicing which is required after the fixed time has elapsed differs as a rule from the servicing required after the fixed distance has been covered (in the latter case, an oil change is usually all that is required), an illuminated sign can be turned on after the fixed time has elapsed, the sign being different from the sign which is turned on after the fixed distance has been traversed. This distinction can be made for example by using the illuminated sign "oil change" after the fixed distance has been traveled and "inspection" after the fixed time has elapsed.

When the fixed time is exceeded, a warning sign can remain lit permanently, as in the case of the fixed distance being exceeded.

This warning sign can consist of warning lights for the distance overrun intervals. For this purpose, equal time overrun intervals are assigned to the distance overrun intervals which are approximately half as long as the fixed time intervals, and these warning lights are switched on if the time overrun intervals occur before the corresponding distance overrun intervals are covered. This halving of the time intervals after the fixed time has elapsed results in a significantly more rapid intensification of the warning function, even in the case of motor vehicles which are driven infrequently.

In most cases, maintenance is carried out long before the fixed time has expired, and after the fixed distance has been traveled. As an example, the fixed time could be a period of eleven months, and the fixed distance would be 10,000 km. In this case, maintenance consists of an oil change. After approximately twice the fixed distance has been traveled, the so-called maximum distance, a more comprehensive maintenance operation is usually required. This maintenance operation corresponds in scope approximately to the maintenance performed after the fixed time has elapsed. In order to call attention to such maintenance particularly clearly with the aid of the display, after maintenance has been performed prior to expiration of the fixed time, in other words as a rule after the fixed distance has been traversed, the difference between the distance traveled and the maximum distance which is approximately twice as long as the fixed distance is divided into equal differential distance intervals, whose number is equal to the number of fixed distance intervals and the differential distance intervals are indicated instead of the fixed distance intervals. Immediately after such maintenance is performed, the switch status of the pilot lights is determined by the elapsed time, which is still monitored. Subsequently, however, the switch status of the pilot lights is again frequently determined by the distance traveled.

As in the case which pertains after the fixed distance has been traveled and the fixed time has elapsed, the warning display can also be turned on after the maximum distance has been traveled. In this case, the driver is driven accurate information on the amount by which he has exceeded the maximum distance.

In addition, after the maximum distance has been traveled, the same illuminated sign that appears after the fixed time has expired is turned on. This indicates that the maintenance to be performed in both cases is largely the same.

In a circuit for such a display, the pilot lights are connected to the corresponding outputs of a travel counter and a time counter through OR elements. This ensures that the switch status of the pilot lights is changed by the first of the two associated outputs of the two counters, and that the subsequent change in the other output has no effect upon the switch status of the pilot light.

An advantageous embodiment of such counters consists in shift registers, which are clocked as the fixed distance or fixed time intervals elapse.

In addition to the pilot lights, the warning lights can also be connected to other outputs of the shift registers through OR elements, whereby the shift registers are also clocked as the distance overrun or time overrun intervals elapse.

After "minor" maintenance prior to expiration of the fixed time has been performed, the maximum travel now being measured can be taken into account by virtue of the fact that during this maintenance the pilot lights and warning lights are connected to the outputs of an additional pair of shift registers, one of which is clocked at each differential distance and each distance overrun interval and the other of which is clocked accordingly at each fixed time interval and each time overrun interval.

The pilot and warning lights can be switched in response to the shift register pairs by means of a flipflop circuit whose two outputs control AND elements for the outputs of the shift registers, and to whose two inputs RC elements with different time constants are connected, said elements being activated simultaneously through a common switch. The RC element with the shorter switching time, for example, controls the shift register for the fixed distance and fixed time intervals, and the corresponding overrun intervals, while the RC element with the longer time constant controls the two shift registers for the differential distance intervals and the fixed time intervals and the corresponding overrun intervals. A multiplexer can be used to clock the shift registers, said multiplexer activating the outputs of the corresponding processors which correspond to the fixed distance, distance overrun, or differential distance intervals, or the fixed time and time overrun intervals. The processors have outputs which deliver a clock pulse at the spacing of the corresponding distance and time intervals.

In order to refine the information from the display, a distance signal can be monitored instead of the fixed distance, said signal being evaluated as a function of the load on the engine. If the engine is subjected to a greater than average load, the recorded distance will be greater than the distance actually traveled. Thus, the need for maintenance will be signaled earlier, corresponding to the actual need, than would be the case if engine load were not taken into account.

The load on the engine can be taken into account by making the evaluation depend, for example, on the rpm, coolant temperature, engine oil temperature, and/or instantaneous fuel consumption. These and other operating parameters can be monitored either individually or in any combination.

Accordingly, it is an object of the invention to provide method and apparatus for service-interval display for motor vehicles in which the process of the vehicle in distance and/or time through a fixed distance and/or time is incrementally indicated, a signal being delivered after said fixed distance and/or time has been traversed.

It is a further object of the invention to provide method and apparatus for service-interval display for motor vehicles which is both precise and clear as to the indication produced.

It is another object of the invention to provide method and apparatus for producing a clear massage by way of a service-interval display for motor vehicles which is of low cost in manufacturing.

It is another object of the invention to produce a service-interval display wherein pilot lights are turned on before the traverse of corresponding fixed distance intervals when the vehicle ignition circuit is closed and are extinguished when or immediately after the engine starts.

It is another object of the invention to display one or more warning lights after the extinction of pilot lights, the latter corresponding to vehicle traverse of fixed distance intervals.

It is another object of the invention to provide warning lights which are of a different color from the pilot lights.

It is another object of the invention to provide a service-interval display wherein a fixed time (T) is associated with a fixed distance (D), the time being divided into a number of fixed time intervals ($i_t$) which is equal to the number of fixed distance intervals ($i_d$) and by the fact that the switch status of the signal elements is changed when the corresponding fixed time interval ($i_t$) elapses before the corresponding fixed distance interval ($i_d$).

It is another object of the invention to provide a service-interval display wherein one or more warning indicators remain turned on when a fixed time (T) is exceeded.

It is a further object of the invention to provide a service-interval display wherein equal time overrun intervals ($t_o$) are assigned to distance overrun intervals ($i_o$), the said intervals being half as long as fixed time intervals ($i_t$) and when the distance overrun intervals ($i_o$) elapse before the corresponding time overrun interval ($t_o$) has been covered, warning lights are turned on.

It is an additional object of the invention to provide a service-interval display such that, when a maintenance operation is performed before a fixed time (T) has elapsed, the difference between the distance traveled and a maximum distance (M) is divided into equal differential distance intervals ($i_{diff}$), whose number is equal to the number of fixed distance intervals ($i_d$), the difference being displayed by lighting indicators, one for each differential distance interval traveled.

It is another object of the invention to provide a service-interval display wherein after a maximum distance (M) has been covered, a warning indicator is turned on in the same fashion as after a fixed distance (D) has been covered.

It is a further object of the invention to provide a service-interval display wherein pilot lights are connected to corresponding outputs of distance and time counters through OR elements, the distance and time counters being shift registers, additional outputs of the shift registers being connected to warning lights through OR elements such that when vehicle maintenance is performed before a fixed time (T) elapses, pilot lights and warning lights are connected to the outputs of an additional pair of shift registers, one of which shift registers is clocked with each differential distance interval and each distance overrun interval ($i_d$, $i_o$) and the other shift register is clocked according to each fixed time and each time overrun interval ($i_t$, $t_o$), the switching of the shift register pairs being effected by a bistable circuit and the clocking of the shift registers being accomplished by a multiplexer activating outputs of corresponding processors associated with the fixed distance, distance overrun and differential distance intervals and the fixed time and time overrun intervals.

It is a further object of the invention to provide a service-interval display characterized by the fact that the distance traveled, before recording thereof is estimated as a function of the load of the engine characterized in terms of at least one of rpm, coolant temperature, oil temperature, and instantaneous fuel consumption.

These and other objects, features, and advantages of the present invention will become more apparent from the following description when taken in connection with the accompanying drawings which show, for the purposes of illustration only, an embodiment in accordance with the present invention. Like reference numerals are used throughout to designate like parts.

FIG. 6 shows a multiplexer circuit.

Figure 1:
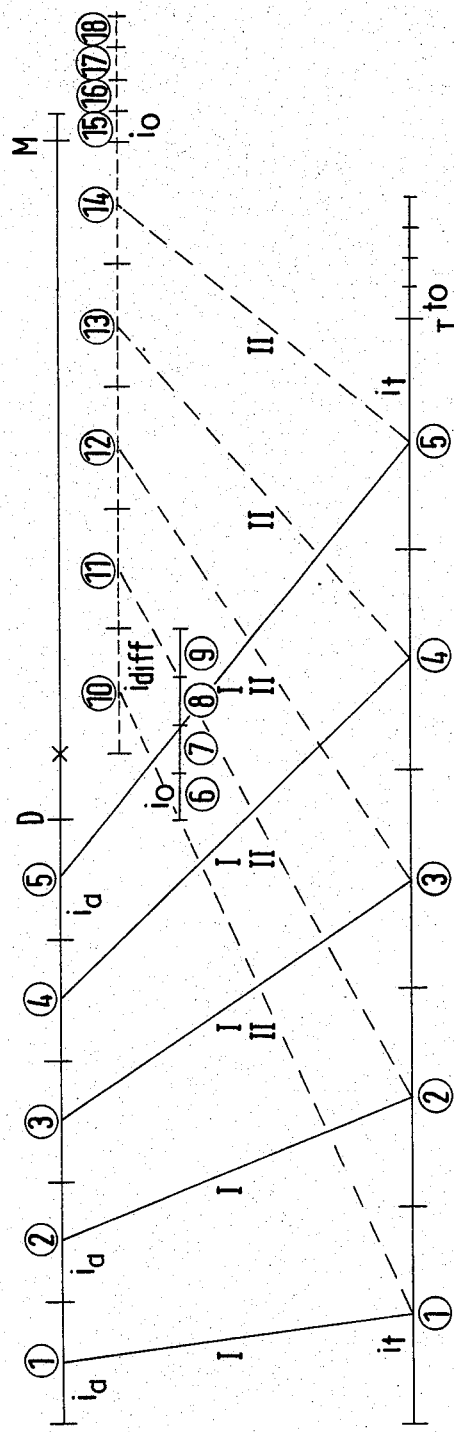
FIG. 1 is a diagram which shows the designations used for distance and time.
Figure 2:
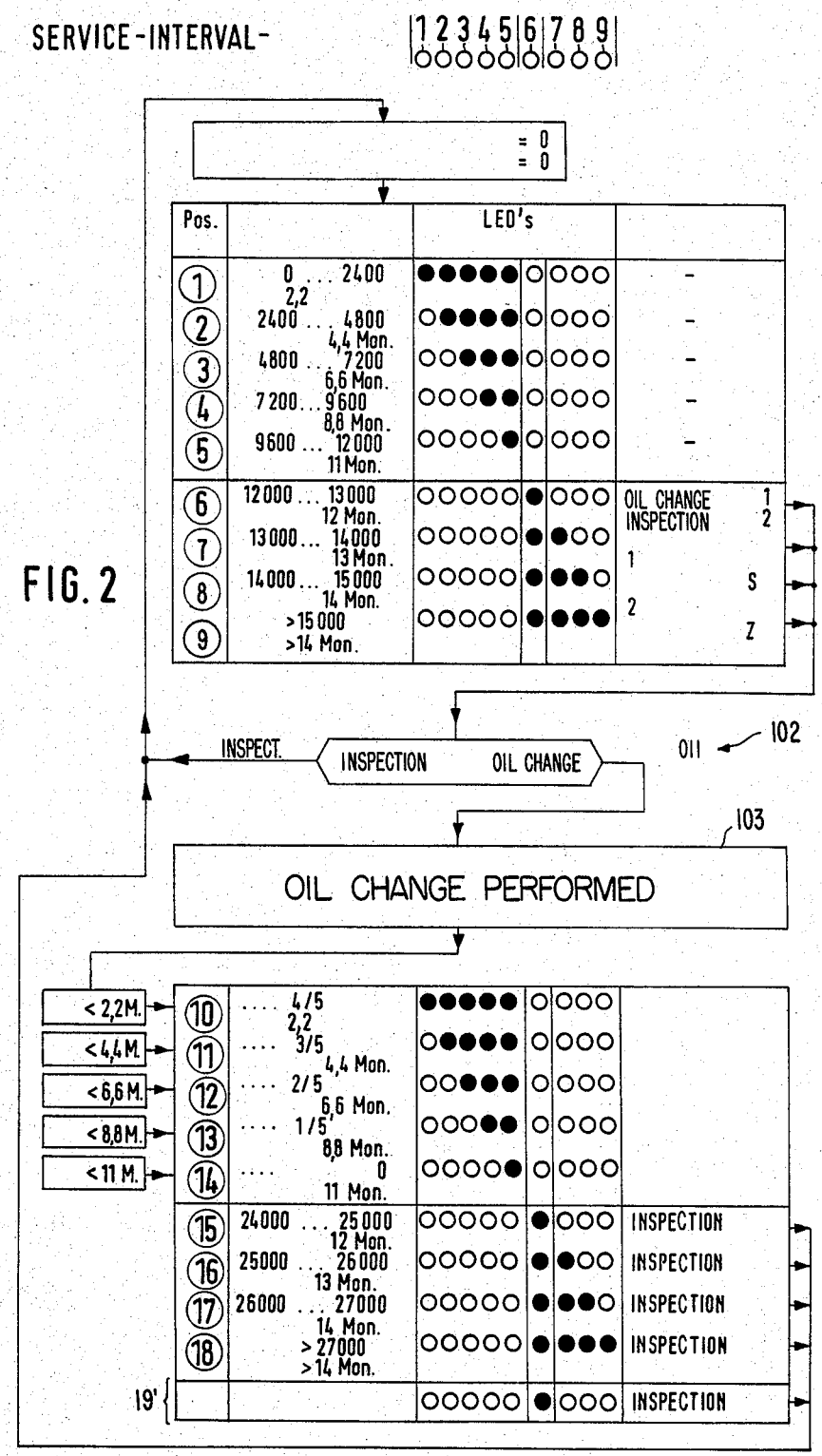
FIG. 2 shows a flow chart for a service interval display for motor vehicles in its various possible stages.

As FIG. 1 indicates, the distance traveled after a "major" maintenance operation has been performed ("inspection" with extensive maintenance work) or, in the case of a new vehicle, up to a fixed distance D, approximately 12,000 km, is divided into five equal fixed distance intervals $i_d$. When the vehicle has traveled fixed distance D, the display assumes the stages 1 to 5 shown in FIG. 2, without taking the time into account. These stages are marked on the fixed intervals $i_d$ in FIG. 1, and the encircled numbers represent the display stages for which FIG. 2 shows the conditions of the light emitting diodes, LEDs. In FIG. 2, a solid circle or dot represents a lighted diode while a hollow circle represents an unlit diode. Four identical distance overrun intervals $i_o$ follow fixed distance intervals $i_d$; the distance overrun intervals to are approximately half as long as the fixed distance intervals $i_d$, i.e., they are approximately 1000 km long, and become operational, that is, warning lights are lit, if no "minor" maintenance ("oil change") which becomes necessary after fixed distance D has been traversed, has been performed. Stages 6 to 9 of the display are associated with intervals $i_o$.

If "minor" maintenance is performed, the distance remaining until a maximum distance M has been reached is divided once again into five equal differential distance intervals $i_{diff}$, to which stages 10 to 14 on the display are assigned according to stages 1 to 5. The maximum distance M is twice as long as the fixed distance D, i.e., it is 24,000 km. If no "minor" maintenance is performed within maximum distance M, it is followed by distance overrun intervals $i_o$, corresponding to intervals $i_o$ which, like the latter, have a value of approximately 1000 km and to which stages 15 to 18 corresponding to stages 6 to 9 of the display are assigned.

Which of stages 1 to 18 the display actually assumes depends both on the distance traveled and upon the time which has elapsed since the last "major" maintenance (in the case of a new vehicle, since it began to be driven). This time is determined by a fixed time T, eleven months for example, after which "major" maintenance must be performed in any case. Fixed time T is likewise divided into five fixed time intervals $i_t$ of equal length, which are initially assigned to fixed distance intervals $i_d$.

Figure 4A:
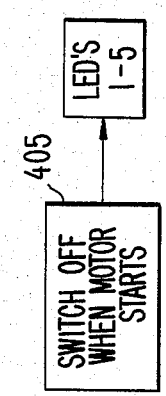
FIGS. 4, 4A show a circuit for a display of the invention as well as details of parts of the circuit.
Figure 5:
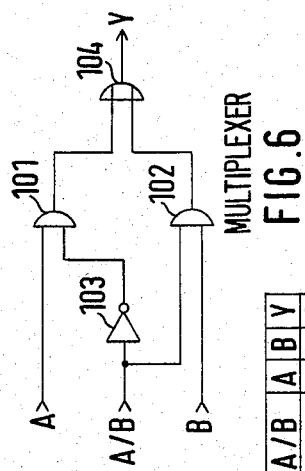
FIG. 5 shows a reset logic circuit.
Figure 4:
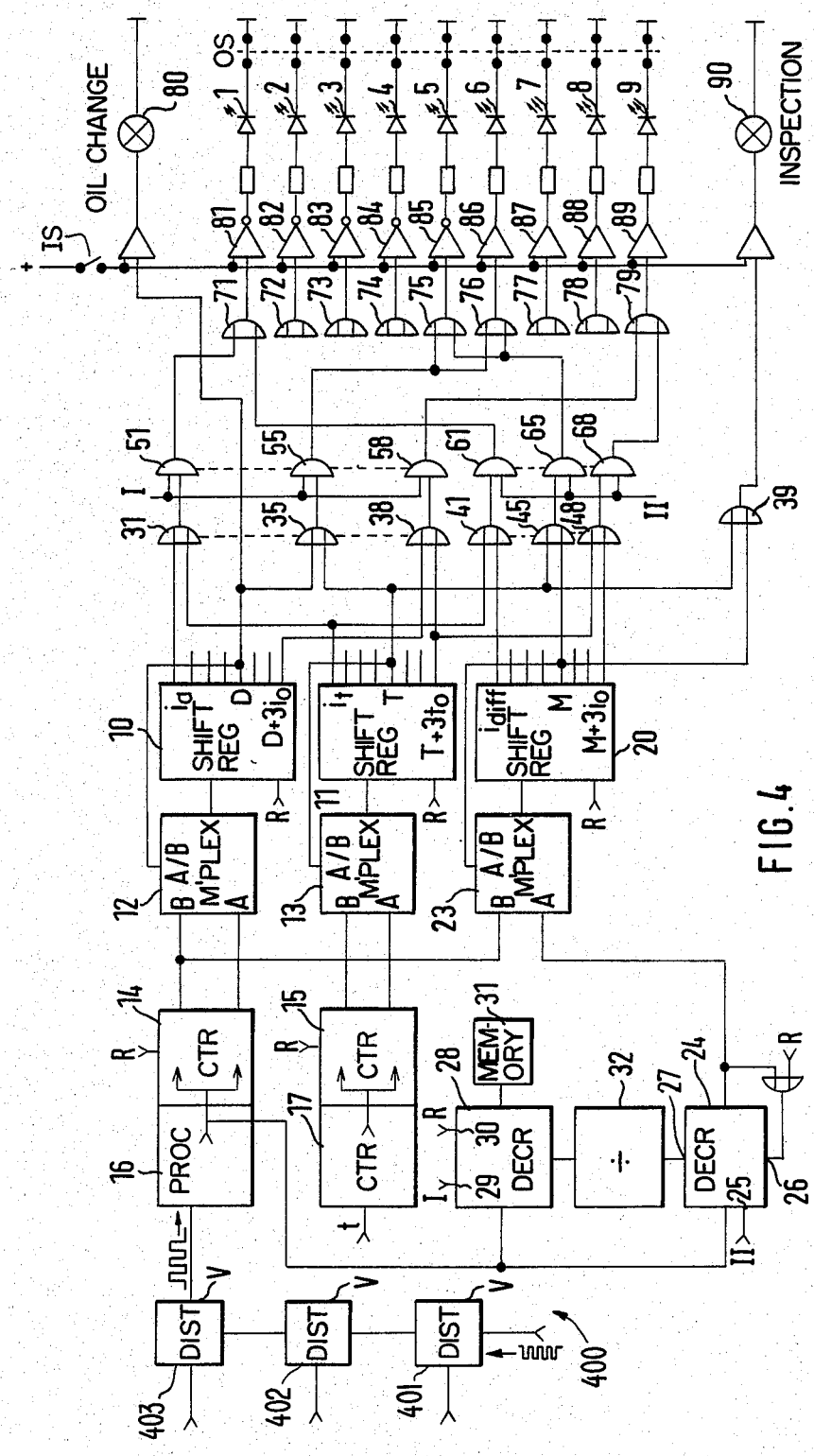

The circuit which belongs to the display and is shown in FIGS. 4 to 6 is shown in a state I which is explained in greater detail below. Fixed time T is followed by four time overrun intervals $t_o$ of equal length which are approximately half as long as fixed time intervals $i_t$ and thus have a length of about one month. These time overrun intervals are initially assigned to the distance overrun intervals $i_o$.

If the vehicle travels fixed distance D before fixed time T has elapsed and a "minor" maintenance operation is performed during the subsequent distance overrun, the circuit, as shown in FIGS. 4 to 6, assumes a state II in which the fixed time intervals $i_t$ are now assigned to the differential distance intervals $i_{diff}$ and the time overrun intervals $t_o$ are assigned to the distance overrun intervals $i_{o'}$.

The allocation of the different intervals to the two stages I and II of the circuit, and thus to the display, is indicated by solid or dashed lines in FIG. 1.

The display operates as follows: the stage of the display is determined by the distance or time interval associated therewith, which is reached first. For example, if the display is in stage 2, it switches to stage 3 as soon as the second fixed distance interval has elapsed or, the second fixed time interval has elapsed, if the latter happens first.

As shown in FIG. 2, the display consists of nine LEDs 1 to 9, with five leftmost diodes 1 to 5 being green, a yellow diode 6 to the right thereof and three rightmost diodes 7 to 9 red. The device also has a sign area or indicator corresponding to step 102, FIG. 2, which can also be located remotely from the LEDs, bearing the words "OIL CHANGE" and "INSPECTION".

The various stages of the display and the critical conditions for them are shown in FIG. 2 as a flowchart. These stages refer to the arrangement in FIG. 1 with solid lines between the fixed distance and distance overrun intervals $i_d$ and $i_o$ and the fixed time and time overrun intervals $i_t$ and $t_o$.

If "major" maintenance is performed after the fixed time T has elapsed, flowchart I applies once again. On the other hand, if "minor" maintenance ("OIL CHANGE") is performed before the fixed time T elapses and after the fixed distance D has been traveled, flowchart II and the arrangement which applies to it, indicated by the dashed lines in FIG. 1, will apply. The sign area shown in flowcharts I and II serves to distinguish between the two types of maintenance. In this area, the "minor" maintenance required after the fixed distance is traveled is indicated by the words "OIL CHANGE" while "major" maintenance after the fixed time has elapsed or after the maximum distance has been traveled is indicated by "INSPECTION".

At the start, all green LEDs are lit as shown at stage 1 of FIG. 2.

As the vehicle is driven, the indicator system proceeds through stages 1 to 9, the green LEDs 1 to 5 being extinguished sequentially first. In stage 6, yellow LED 6 comes on with the corresponding display in the sign area, and then, during stages 7 to 9, the LEDs 7 to 9 come on, corresponding to the overrun intervals.

LEDs 1 to 5 are connected in such a way that they can be turned on when the ignition circuit is closed, provided they are energized in accordance with the distance traveled or the time elapsed. Immediately during or after the starting of the motor vehicle, however, they go out. They may be turned off, as shown for example in FIG. 4A, with the aid of the standard oil pressure switch 405.

LEDs 6 to 9, on the other hand, remain on continuously in the corresponding stages and provide an urgent warning of the need for maintenance.

In the event of "minor" maintenance ("OIL CHANGE"), step 103, FIG. 2, stages 10 to 18 ensue, corresponding to stages 1 to 9 for connection of LEDs 1 to 9. However, at maximum distance M or fixed time T, the word "INSPECTION" appears in the sign area, and indicates the need for "major" maintenance.

A stage 10' is also possible in which, as in stage 15, only LED 6 is lit, and the word "INSPECTION" appears in the sign area. This stage can be indicated for example if there is a defect in the display or if work on the display needs to be indicated.

Figure 3:
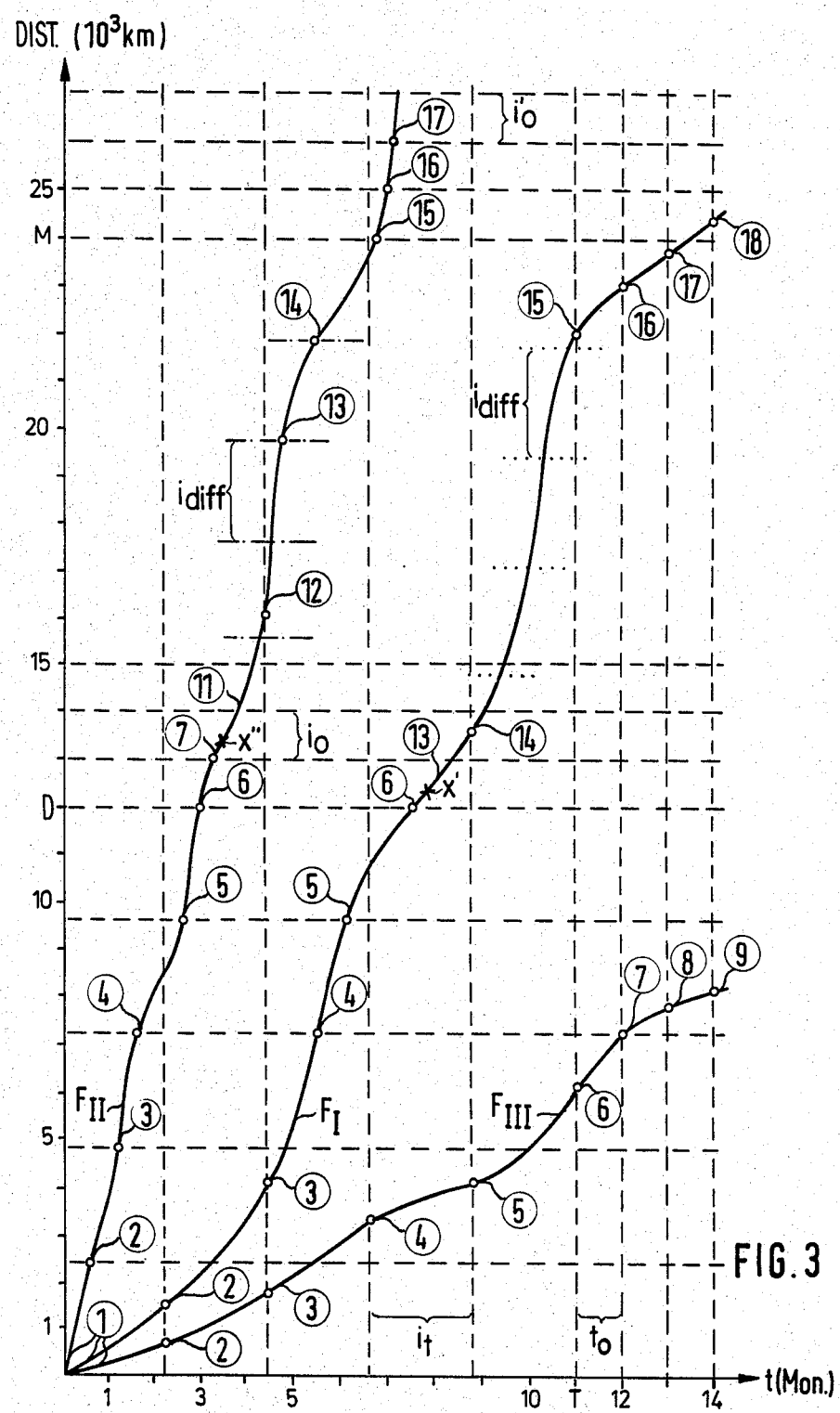
FIG. 3 is a graph showing distance as a function of time for drivers with different driving habits, and with the stages of the display which occur.

In FIG. 3, a graph showing distance as a function of time describes three drivers with different driving habits, corresponding to curves $F_I$ to $F_{III}$, and the resultant stages of the displays.

In FIG. 3, the horizontal axis represents time, in months for example, with a fixed time limit T shown at 11 months. Vertical dashed lines erected from the horizontal axis demark fixed time intervals of 2.2 months.

The vertical axis represents distance in thousands of kilometers with a fixed distance D shown for example at 12000 km and a maximum distance M at 24000 km. Horizontal dashed lines between o and D represent fixed distance intervals $i_d$.

Curve $F_I$ corresponds to average driving behavior. Stages 2 and 3 of the display are reached when the limits of the two fixed time intervals are exceeded. Stages 4, 5 and 6, on the other hand, are reached when the corresponding limits of the fixed distance intervals are exceeded.

Since the fixed time T has not yet elapsed, the words "OIL CHANGE" appear in the indicator after fixed distance D has elapsed. This service is performed within the first distance overrun interval $i_o$, and is marked by an x'.

The differential path remaining until maximum travel M is divided into five equal intervals $i_{diff}$ (cf. FIG. 1) and is assigned to the same fixed time intervals. The "on" stage of the display is determined immediately during the oil change by the expired time; since the fourth fixed time interval is critical, stage 13 is set when the oil is changed. When their times have expired, stages 14, 15, 16 and 17 are set in sequence. At the same time, in stage 15, the word "INSPECTION" appears in the indicator. When this operation is carried out, stage 1 is set once more and all of the distance and time counters are reset to the starting positions. The reset of the distance and time counters after oil change and inspection may be effected manually as will be explained in connection with FIG. 5 below.

Curve $F_{II}$ illustrates a driving pattern in which a long distance is covered in a relatively short time. Stages 2 to 7 are set by exceeding the corresponding fixed distance interval limits. The oil change is performed in the second distance overrun interval as shown at x. The remaining distance until the maximum distance M is then divided into five equal differential distance intervals $i_{diff}$. The limits of these intervals are indicated by vertical dashed lines. Since the oil change is performed in the second fixed time interval, stage 11 is also set to correspond to stage 2 of the display. Stage 12 is reached by exceeding the second fixed time interval, while stages 13 to 15 are reached by exceeding the limits of the third, fourth, and fifth differential distance intervals. If "major" maintenance is not performed, stages 16 to 18, the latter stage not shown in FIG. 2, are set by exceeding the corresponding distance overrun intervals $i_o$.

Finally, curve $F_{III}$ is characteristic of a driver who drives less than average. Stages 2 to 6 are set exclusively by exceeding the limits of the fixed time interval T. The word "INSPECTION" then appears in the sign area. If the inspection is not performed, stages 7 to 9 are also reached as the time overrun intervals go by.

A circuit by which stages 1 to 18 of the display are controlled as a function of the elapsed time, the distance covered, and the moment at which a maintenance operation is carried out, is shown in FIG. 4.

LEDs 1 to 9 are controlled by two of three shift registers 10, 11 and 20, which operate when stages 1 to 9 (shift registers 10 and 11) or stages 10 to 18 (shift registers 20, 11) are operational. Shift register 10 is clocked through a multiplexer 12 at the interval of the fixed distance interval $i_d$ and the distance overrun interval $i_o$. Circuitry for multiplexers 12, 13 and 23 will be explained below in connection with FIG. 6. Shift register 11 receives its clock pulses at the interval of the fixed time intervals $i_t$ and the time overrun intervals $t_o$. Shift register 20 roughly corresponds to shift register 10 and is clocked upon expiration of the differential distance intervals $i_{diff}$ and the travel overrun intervals $i_o$ which follow the maximum distance M (see FIG. 1).

As in shift register 10, a multiplexers, 13 or 23, are respectively connected in series with shift registers 11 and 20, said multiplexer determining the effective pulse width. The pulse width is delivered by processors 14 and 15 as well as by a binary decrementer 24. For processor 14, it has values of 1000 to 2400 km for example corresponding to the distance overrun and in fixed distance intervals; for processor 15 it has values of 1 and 2.2 months for example, corresponding to the time overrun intervals and fixed time intervals; and for decrementer 24 it has the value of a differential distance interval. This is equal to 1/5 of the difference between the maximum travel and the distance covered before performing a minor maintenance operation (oil change).

The 1000 and 2400 km output of processor 14 is connected to inputs B and A of multiplexer 12; the 1 month and 2.2 month output of processor 15 is connected to inputs B and A of multiplexer 13; and the 1000 km output of processor 14 and the output of decrementer 24 are connected with inputs B and A of multiplexer 23. All multiplexers are set through control inputs A/B.

Processor 14 is clocked by a processor 16, which receives distance pulses corresponding to the distance traveled (for example, through a wheel revolution sensor mounted on the rear axle of the vehicle shown at 400), and delivers a standardized clock signal at its output which corresponds to a distance traversed of 1 km. Thus, processor or counter 14 counts 1000 input pulses at which point it outputs a signal to the B input of multiplexer 12 as the 1000 km signal. After counting 2400 input pulses, it produces an output signal to the A input of multiplexer 12. The clock signal output from processor 16 is also fed to binary decrementer 24. Processor 15 receives a pulse at regular intervals of 0.1 month for example, which pulse appears in the output of a processor 17. Processor 17 in turn is clocked by a timer, not shown. The timer and processor 17 may be constituted by a series of counter chains, the final overflow pulse is produced at intervals of 0.1 month. Processor 15, in turn counts the 0.1 month pulses, producing a signal at input B of multiplexer 13 after 10 input pulses, and after 22 input pulses, issues an output signal to terminal A of multiplexer 13, representing 2.2 months.

Decrementer 24 is equipped with an enable input 25, a set input 26, and an additional input 27 through which the calculated differential distance intervals $i_{diff}$ are entered.

A binary decrementer 28 with an enable input 29 and a set input 30, to which the output signal of processor 16 is fed, serves to determine the differential distance interval $i_{diff}$. In addition, decrementer 28 is connected with a constant memory 31 for maximum travel M, here equal to 24,000 km. Constant memory 31 presents an output representing for example 24000 km, to binary decrementer 28. As successive 1 km pulses are received from processor 16 by binary decrementer 28, the latter serves to subtract the 1 km value serially from the value presented by constant memory 31 to produce an output to binary arithmetic unit 32 of the differential distance. It will be seen that as 1 km pulses continue to be received by binary decrementer 28, the value presented to binary arithmetic unit 32 continues to be reduced.

Binary arithmetic unit 32 is connected to decrementer 28, said arithmetic unit determining the value of one of the output value of decrementer 28 and transmitting that value to decrementer 24. Binary arithmetic unit 32 may thus take the form of a binary divider which divides the output from decrementer 28. In the example given, the division is by 5.

LEDs 1 to 9 are connected to the eight corresponding outputs of shift registers 10, 11 and 20 through OR elements 31 to 38 and 41 to 48, the AND elements 51 to 58 and 61 to 68 following the OR elements, and the corresponding AND elements 51 and 61, 52 and 62 . . . 58 and 68 through OR elements 71 to 79. The AND elements 51 to 61, 52 to 62, 53 to 63, 54 to 64, 56 to 66, 57 to 67, and 58 to 68 are each connected to one of the OR elements 71 to 74 and 76 to 79, while the AND elements 55 to 65 are connected to the two OR elements 75 and 76. Inverters 81 to 85, connected to OR elements 71 to 75, in contrast to the LEDs 6 to 9 supplied with simple amplifiers 86 to 89 ensure that LEDs 1 to 5 will be extinguished when at least one of the inputs of OR elements 71 to 75 is at a high potential.

It will be appreciated that the person of ordinary skill in the art will recognize as one of the numerous possibilities for activating the LEDs 1-9 that an input controlled by the ignition switch IS may be introduced to the inverters 81-85 and the amplifiers 86-89 and the amplifiers actuating the indicators 80 and 90.

By the same token, an oil pressure may serve to actuate a relay to open switch contacts OS upon oil pressure reaching a predetermined value. The LED circuit corresponds to the circuits used in conventional auto pressure monitor lights.

AND elements 51 to 58 and 61 to 68 are switched by a control and reset logic which is shown in FIG. 5. The logic contains a flipflop 111 whose inputs J and K are connected through inverters 112 and 113 with RC elements 114, 115 with different time constants. RC elements 114 and 115 may have time constants of 3 and 10 seconds, for example. They can be activated jointly and simultaneously by a switch 116. When switch 116 is closed, the RC element 114 and inverter 112 control the input J of flipflop circuit 111. Consequently, its output $\bar{Q}$ is activated and a stage I is set which is associated with stages 1 to 9 of the display (FIG. 2). At the same time, a monoflop 117 is activated and this provides the inputs of the circuit elements shown, designated R in FIG. 4, with a reset pulse R. If switch 116 is pressed for a longer time, 10 seconds for example, RC element 115 and inverter 113, as well as output K of flipflop element 111, is activated, which in turn switches to output Q. As a result, stage II corresponding to stages 10 to 18 of the display becomes operational.

Control inputs A/B of multiplexers 12, 13 and 23, FIG. 4, are controlled by the outputs of the corresponding shift registers 10, 11 and 20, which correspond to the fixed distance D, the fixed time T, and the maximum distance M. The design of multiplexers 12, 13, 22 and 23 is shown separately in FIG. 6 together with the corresponding truth table.

These multiplexers contain two AND elements 101 and 102, connected on the one hand with inputs A and B and on the other hand through an inverter 103 or directly with the input A/B. The outputs of AND elements 101 and 102 are fed to an OR element 104, whose output is fed to shift registers 10, 11 and 20. As can be seen from the truth table, the stage at input A appears at the output of the multiplexer with a low potential on input A/B independently of input B and the stage of input B appears with a high potential at input A/B independently of input A. It is therefore possible to determine from input A/B which of inputs A or B is operational.

In a new vehicle, or after "major" maintenance is performed, output Q̄ of flipflop 111 is operational, ie., the circuit in FIG. 4 is in stage I. Processors 16 and 17 receive distance and time pulses corresponding to the distance traveled or the time elapsed and pulses are transmitted to processor 14 and binary decrementer 28 as well as processor 15. Inputs A/B of multiplexers 12 and 13 initially receive a low potential and therefore switch inputs A of multiplexers 12 and 13, making them operational. Decrementer 24 is nonoperational, since its enable input 25 is not occupied.

Shift registers 10 and 11 are clocked at intervals of 2400 km corresponding to a fixed distance interval $i_d$ or 2.2 months corresponding to a fixed time interval $i_t$. As long as this clocking does not take place, however, i.e., as long as the first fixed distance interval has been traversed and the first fixed time interval has not elapsed, the (green) LEDs 1 to 5 are lit. This connection is made so that it occurs when the ignition circuit is closed, and is immediately broken after the engine starts. This is accomplished for example by an oil pressure switch, not shown, which is connected in series with the LEDs.

However, if the first fixed distance interval or the first fixed time interval have elapsed, stage 2 of the display rather than stage 1 is created (FIG. 2) and LED 1 remains extinguished with LEDs 2-5 lit. According to the table in FIG. 2, further clocking causes shift registers 10 and 11 to pass through stages 3 to 5.

If stage 6 is reached at the end of stage 5 as a result of fixed distance D having been traversed, the last green LED 5 also goes out, and (yellow) warning light 6 comes on. At the same time the illuminated indicator "OIL CHANGE" shown in the form of bulb 80, FIG. 4, comes on, controlled by the output of shift register 10, corresponding to the fixed distance.

However, if stage 6 is reached before fixed time T has elapsed, an OR element 39 controls the "INSPECTION" sign in the form of bulb 90, FIG. 4. The OR element 39 is then controlled by the output of shift register 11, which corresponds to fixed time T.

When stage 6 is reached after the fixed distance D has been traversed or the fixed time T has elapsed, the pulse width which is critical for shift registers 10 to 11 is reduced, while their inputs B are switched and made operational via inputs A/B of multiplexers 12 and 13. Shift registers 10 and 11, after fixed distance D has been traversed, are then clocked at the interval of the distance overrun intervals of 1000 km or, if the fixed time T has elapsed, at the intervals of the time overrun intervals, one month for example. Stages 7 to 9 can therefore be reached at shorter intervals.

If the inspection, which is required when a fixed time has elapsed, is performed, then all the shift registers and other counters are returned to their starting positions. For this purpose, switch 116, FIG. 5, is actuated for a longer time, 10 seconds for example. The described control of the LEDs corresponding to stages 1 to 9 then begins over again.

On the other hand, if stage 6 is reached after the fixed distance has been traversed, only an oil change will be required in this case, the so-called "minor" maintenance. In this case, stages 10 to 17 of the display will be operational. This is accomplished with the aid of switch 116, which is pressed for a relatively short time, 3 seconds for example, and thus activates output Q of flipflop 111. Output Q then supplies the inputs of AND elements 61 to 68, marked II, with high potential.

When output Q is activated, enable input 29 of decrementer 28 is blocked. This counter thus contains the differential distance between maximum travel M corresponding to the value stored in constant memory 31 and the distance traveled until the oil change was made. Arithmetic unit 32 performs a division operation and generates the fifth part of this differential distance, and thus provides the differential distance intervals. These intervals are fed into decrementer 24. The latter is then controlled through its enable input 25, and receives the output signals from processor 16. As soon as a distance overrun interval has been covered, shift register 20 is clocked through multiplexer 23 with its operational input A. At the same time the set input 26 of decrementer 24 is controlled, and a differential distance interval is again entered. This continues until the maximum distance is reached. If the fixed time has not yet elapsed by this point, output M switches maximum distance M of shift register 20 via control input A/B which combines with the input B of multiplexer 23 via an AND circuit such as 102, FIG. 6, to produce an output pulse from multiplexer 23. Stages 16, 17 and 18 are then reached much more rapidly corresponding to stages 7 to 9. At the same time, the illuminated "INSPECTION" sign (bulb 90 of FIG. 4) which is controlled through OR element 39 from the output of shift register 20 corresponding to maximum distance M, provides an indication of the need for "major" maintenance.

Instead of the sample distance traveled, an evaluation of the distance pulses reaching processor 16 corresponding to the load on the engine can be performed. For this purpose, for example, additional processors 401–403, can be connected in series between the wheel revolution sensor input 400 and processor 16, said processors 401–403 remaining non-operational only as long as the operating parameters associated with these processors have an abnormal value. These operating parameters can be for example the coolant temperature input of 401 for example, the engine oil temperature input at 402, or the rpm input at 403. By appropriately switching the processors, a situation can be created in which the estimate is made as a function of the magnitude, duration, or maximum value of the abnormal parameter. In this way, the necessary "minor" or "major" maintenance can additionally be adjusted to the already monitored operating time of the actual load on the engine, and an extension of the maintenance interval can be achieved as a result of the precise determination of the maintenance time which can be achieved thereby.

For example, if coolant temperature is sensed at an abnormal level, high and low, the resulting analog signal is employed to change the frequency of clock input to processor 16, thus the time before values for D, T and M are output by shift registers 10, 11 and 13.

Similarly, abnormal values, high or low, for parameters such as engine oil temperature and rpm may be caused to change clock input rate to processor 16 to change the time of occurrence of D, T and M.

The LEDs 1–9, oil change bulb 80 and inspection bulb 90 have been shown as optical indicators. It will be appreciated by those skilled in the art that some or all of the indicators may be implemented as aural indicators wherein the characteristics of the sound either as to magnitude or tone are employed as distinguishing features where more than one aural indicator is used.

Alternatively, such aural indicators may be used to augment rather than substitute for the optical indicators described above.

It will be appreciated that while the distance and time intervals such as ($i_d$) and ($i_t$) and the like have been disclosed as of equal magnitude, special circumstances may require variable and unequal intervals. By the same token, warning intervals need not be one-half the magnitude of ($i_d$) and ($i_t$) but may assume some other relationship thereto.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A service-interval display for motor vehicles, which delivers a signal after a fixed distance (D) has been traversed wherein the fixed distance (D) is divided into several fixed distance intervals ($i_d$) of equal size comprising
    means for sensing distance travelled by the vehicle and
    a plurality of individual signal switch means each associated with a respective fixed distance interval ($i_d$) and responsive to the means for sensing to change its switch status at the end of its respective interval ($i_d$).

2. A service-interval display according to claim 1 wherein the signal switch means comprise
    pilot lights extinguished at the end of their respective fixed distance intervals ($i_d$).

3. A service-interval display according to claim 2 wherein said motor vehicle has an engine and ignition circuit therefor, said display further comprising
    means responsive to closure of the ignition circuit for turning the pilot lights on before the end of their respective fixed distance intervals ($i_d$) and
    means for extinguishing the pilot lights when the vehicle engine starts.

4. A service-interval display in accordance with claim 1 further comprising
    means for indicating a required oil change, said means being activated after the extinction of the individual signal switch means corresponding to the last fixed distance interval ($i_d$) traversed by the motor vehicle.

5. A service-interval display in accordance with claim 4 further comprising
    a first warning indicator means responsive to indicate a warning when fixed distance (D) is exceeded.

6. A service-interval display according to claim 5 wherein the first warning indicator means displays a colored indication which is different from the color of the pilot lights.

7. A service-interval display in accordance with claim 6 further comprising
    a plurality of second warning indicator means each activated in succession after equal distance overrun intervals ($i_o$) traversed by the vehicle following the traverse of the fixed distance (D).

8. A service-interval display in accordance with claim 7 wherein the overrun intervals ($i_o$) are approximately half as long as the fixed distance intervals ($i_d$).

9. A service-interval display in accordance with claim 5 further comprising
    means for maintaining a display of the first warning indicator means in activated condition when the fixed time (T) is exceeded.

10. A service-interval display according to claim 7, wherein
    equal time overrun intervals ($t_o$) are assigned to corresponding distance overrun intervals ($i_o$), said time overrun ($t_o$) intervals being half as long as the fixed time intervals ($i_t$), each time overrun interval ($t_o$) corresponding to a fixed distance overrun interval ($i_o$) and
    means for indicating a warning when a fixed distance interval ($i_d$) elapses before the corresponding time overrun interval ($t_o$) has elapsed.

11. A service-interval display in accordance with claim 4 further comprising
    an "inspection" indicator different from the "oil change" indicator and
    means for activating the inspection indicator after the last fixed distance interval ($i_d$) has been traversed by the vehicle.

12. A service-interval display in accordance with claim 1, wherein a fixed time (T) is associated with fixed distance (D), said time being divided into a number of fixed time intervals ($i_t$) the number of which is equal to the number of fixed distance intervals ($i_d$), comprising
    means for changing the switch status of the individual signal switch means when the corresponding fixed time interval ($i_t$) elapses before the corresponding fixed distance interval ($i_d$).

13. A service-interval display according to claim 12 wherein the signal switch means comprises pilot lights, and the means for sensing distance travelled includes
    a distance counter,
    a time counter, and
    OR logic means responsive to outputs of the distance counter and time counter for actuating each of the pilot lights.

14. A service-interval display according to claim 13 wherein
    the distance counter comprises a distance shift register providing a signal when a fixed distance has been traversed by the vehicle and wherein
    the time counter comprises a time shift register providing an output signal when a fixed time interval has been completed.

15. A service-interval display in accordance with claim 14 further comprising
    means providing an output from the distance shift register as the vehicle traverses a distance overrun ($i_o$), and
    means for providing an output from said time shift register when time overrun intervals ($t_o$) occurs.

16. A service-interval display according to claim 14 wherein said time shift register produces an output signal when each fixed time and each time overrun interval ($i_t$, $t_o$) are completed, and includes
    a differential distance shift register producing an output when a differential distance interval ($i_{diff}$) and each distance overrun interval ($i_o$) are completed,
    further pilot lights and warning lights, and
    means for connecting the outputs of said time and differential distance shift registers to actuate said further pilot lights and warning lights when maintenance is performed before fixed time (T) elapses.

17. A service-interval display according to claim 16 wherein said means for connecting the pilot lights and warning lights to said time and differential distance shift registers comprises
- AND elements receiving the outputs of said shift registers
- a bistable circuit,
- means connecting the output of the bistable circuit to said AND elements,
- a plurality of RC elements having different time constants and
- means connecting the RC elements to inputs of said bistable circuit for simultaneously activating said AND elements.

18. A service-interval display according to claim 16 which includes
- a plurality of processors, each processor associated with at least one of the fixed distance, distance overrun and difference distance, the fixed time and time overrun intervals, and
- a multiplexer for providing an input signal to each shift register in response to respective outputs of the corresponding processors to produce an output in the corresponding shift register.

19. A service-interval display according to claim 1 wherein
- when a maintenance operation is performed before a fixed time (T) has elapsed, the difference between the distance travelled and a maximum distance (M), which is approximately twice as long as the fixed distance (D) is divided into equal differential distance intervals ($i_{diff}$), whose number of intervals is equal to the number of fixed distance intervals ($i_d$) and further comprising
- means for causing display when each one of differential difference intervals ($i_{diff}$) is traversed by the vehicle 20. A service-interval display according to claim 19 further comprising
- means for activating a first warning indicator after a maximum distance (M) has been covered in the same fashion as after fixed distance (D) has been covered.

21. A service-interval display according to claim 20 further comprising
- an illuminated indicator means for indicating "INSPECTION" activated after the maximum distance (M) has been travelled in a manner similar to the indication activated after fixed time (T) has elapsed.

22. A service-interval display in accordance with claim 1 wherein
- the signal representing distance travelled is recorded as a function of the load on the engine.

23. A service-interval display in accordance with claim 22 wherein the load function of the engine varies according to at least one of rpm of the engine, coolant temperature, oil temperature, and/or instantaneous fuel consumption.

24. A service-interval display for a motor vehicle for indicating vehicle travel through a predetermined distance (D) composed of a plurality of fixed distance intervals ($i_d$) comprising
- first means responsive to a vehicle movement signal for indicating the distance traveled within the predetermined fixed distance (D) comprising a plurality of second means each for indicating that the vehicle is traveling through one of said fixed distance intervals ($i_d$),
- third means for changing the indicating status of one of said plurality of second means when the vehicle passes beyond each fixed distance interval ($i_d$), and
- fourth means for indicating that at least one of the predetermined distance (D) has been traversed and a fixed time (T) has occurred.

25. A service-interval display in accordance with claim 24, wherein the vehicle has an ignition switch and engine, comprising
- means for actuating said second means before the vehicle traverses the corresponding fixed distance interval ($i_d$) when the vehicle ignition switch is closed and deactivating said second means at the time the engine starts.

26. A service-interval display in accordance with claim 24, comprising
- means for establishing and maintaining a warning indication beginning at the time of the changing of the status of the second means corresponding to the last fixed distance interval ($i_d$) traversed by said vehicle.

27. A service-interval display in accordance with claim 24, comprising
- means for continually indicating a warning after said fixed distance (D) is exceeded.

28. A service-interval display in accordance with claim 27, wherein said means for continually indicating illuminates a sign "oil change".

29. A service-interval display in accordance with claim 27,
- wherein said first means and said means for continually indicating respectively emit light of different colors.

30. A service-interval display in accordance with claim 24, comprising
- fifth means each for indicating that the vehicle has traversed each of a plurality of distance overrun intervals ($i_o$) beyond said fixed distance (D).

31. A service-interval display in accordance with claim 24, characterized in the fact that a fixed time (T) is associated with the fixed distance (D), the time (T) being divided into a number of time intervals ($i_t$) corresponding to the number of fixed distance intervals ($i_d$), comprising
- actuating means for each of said second means when the corresponding fixed time interval ($i_t$) elapses before the corresponding fixed distance interval ($i_d$) is traversed.

32. A service-interval display in accordance with claim 24, comprising
- fifth means for continually indicating a warning after said fixed time (T) is exceeded 33. A service-interval display in accordance with claim 32, wherein said fifth means illuminates a sign "inspection".

34. A service-interval display in accordance with claim 30,
- wherein a time overrun interval ($t_o$) is assigned to each of distance overrun intervals ($i_o$), said intervals ($t_o$) being less than fixed time intervals ($i_t$) each time overrun interval ($t_o$) corresponding to respective fixed distance intervals ($i_d$), and further comprising
- means for indicating a warning as a respective time overrun interval ($t_o$) is exceeded.

35. A service-interval display in accordance with claim 24, comprising means for storing a signal representing maximum distance (M) to be travelled by the vehicle and wherein, upon performance of a maintenance operation on the motor vehicle before a fixed time (T) has elapsed, the difference between the distance traveled by the vehicle and maximum distance (M), wherein (M) is greater than the fixed distance (D), is divided into differential distance intervals ($i_{diff}$) and further comprising means responsive at least to a vehicle movement signal each for respectively indicating traverse by the vehicle of each of the differential distance intervals ($i_{diff}$).

36. A service-interval display in accordance with claim 35, comprising
means for continually indicating a warning after said maximum distance (M) has been traversed by the vehicle.

37. A service-interval display in accordance with claim 36, comprising
means for illuminating a sign "inspection" after a fixed time (T) has elapsed.

38. A service-interval display in accordance with claim 24, comprising
means for resetting the service-interval display to its initial condition prior to travel.

39. A service-interval display in accordance with claim 38 wherein
the signal representing distance travelled is a function of at least an engine load characteristic.

40. A service-interval display in accordance with claim 39, wherein the engine load characteristic varies in accordance with at least one of rpm, engine coolant temperature, oil temperature and instantaneous fuel consumption.

41. A service-interval display in accordance with claim 24, wherein at least one of said means for indicating generates an audible signal.

42. Apparatus for a service-interval display for a motor vehicle comprising
first means for visually indicating service intervals,
a first shift register means for generating an output signal representing distance traveled by the vehicle and supplied with an input signal when a fixed distance ($i_d$) is traveled by the vehicle,
a second shift register means for generating an output signal representing time elapsed and supplied with an input signal when a fixed time interval ($i_t$) has elapsed,
gating means controlling the first means in accordance with the output signals of the first and second shift registers.

43. Apparatus for a service-interval display in accordance with claim 42, wherein a fixed distance (D) may be traversed by said vehicle, or a fixed time interval (T) may elapse comprising
means for producing a first input signal for said first shift register when a fixed distance overrun ($i_o$) exceeding (D) is traversed by the vehicle,
means for producing a second input signal for said second shift register when a fixed time overrun ($t_o$) elapses after the fixed time (T) has elapsed, and
means for controlling said first means for visually indicating service intervals in accordance with said first and second output signals.

44. Apparatus for a service-interval display in accordance with claim 43, wherein maintenance is performed on said vehicle before said fixed time (T) elapses, and wherein a plurality of differential distance intervals ($i_{diff}$) represent increments of the difference between the distance traveled at the time the maintenance is performed and a maximum distance (M) where (M) is greater than (D),
wherein a plurality of distance overrun intervals ($i_o$) represent increments representing portions of the distance by which the travel of the vehicle exceeds the fixed distance (D), and wherein each of a plurality of fixed time intervals ($i_t$) correspond to each of a plurality of fixed distance intervals ($i_d$) which are portions of the fixed distance (D), and each of a plurality of time overrun intervals ($t_o$) correspond to each of a plurality of said distance overrun intervals ($i_o$), wherein said second shift register is provided with an input representing each time overrun interval ($t_o$) and further comprising
third shift register means producing an output signal when a differential distance interval ($i_{diff}$) is completed and
means responsive to at least two of said first, second and third shift registers for indicating when maintenance is performed before fixed time (T) elapses.

45. Apparatus for a service-interval display in accordance with claim 44, comprising
means for switching input to the first means for visually indicating service intervals to receive the outputs of said first, second and third shift registers and and
means for controlling said switching in accordance with a plurality of different time constants.

46. Apparatus for a service-interval display in accordance with claim 45, comprising
multiplexing means for providing input to said shift register means in accordance with fixed distance (D), distance overrun intervals ($i_o$), differential distance intervals ($i_{diff}$), fixed time intervals ($i_t$) and time overrun intervals ($t_o$).

47. The method of displaying a service-interval display for motor vehicles comprising the steps of
sensing movement of the vehicle to produce a signal,
modifying the signal in accordance with an engine operating characteristic, to produce clock signals,
generating signals for indicating the distance traveled through a plurality of fixed distance intervals ($i_d$) within a predetermined fixed distance (D),
indicating the passage of the vehicle through the fixed distance intervals in response to said generated signals,
eliminating the indication representing passage of the vehicle through a fixed distance interval when the vehicle passes to a succeeding fixed distance interval and
indicating that the predetermined distance (D) has been traversed.

* * * * *